July 10, 1945.　　　W. A. WHIPPLE　　　2,380,281
EYEGLASSES
Filed Nov. 26, 1942

INVENTOR.
Willis A. Whipple,
BY
Cromwell, Greist + Warden
Attys.

Patented July 10, 1945

2,380,281

UNITED STATES PATENT OFFICE 2,380,281

EYEGLASSES

Willis A. Whipple, Chicago, Ill., assignor to Chicago Eye Shield Company, Chicago, Ill., a corporation of Illinois Application November 26, 1942, Serial No. 466,980

3 Claims. (Cl. 88—41)

The present invention relates to eyeglasses and particularly eyeglasses used in industrial establishments for the purpose of protecting the eyes of workmen. More specifically the present invention relates to frames for such glasses, formed of plastic material, which frames permit ready glazing and reglazing of the glasses without special equipment.

Heretofore it has been the general practice in the production of glasses for industrial use to make them of metal. Due to the improved appearance which results from the use of plastics there is a demand for frames made of plastic materials. A difficulty encountered in the employment of plastics for this purpose is that industrial spectacles have to be reglazed at frequent intervals. In some instances where the lenses of the glasses are subject to the action of abrasive materials, or the like, they repeatedly become pitted and reglazing is required as often as once a week.

With the ordinary plastic frame reglazing can only be accomplished through the use of special tools by persons skilled in the art. A principal object of the present invention is to provide a frame that may be reglazed without the employment of special tools and by persons without special skill.

A preferred embodiment of the invention is shown in the accompanying drawing. It is to be understood that the embodiment shown is for purposes of illustration only and the scope of the protection sought and defined by the appended claims is not to be unduly limited thereby, as the invention may be embodied in various forms.

Referring to the drawing.

Figure 1:
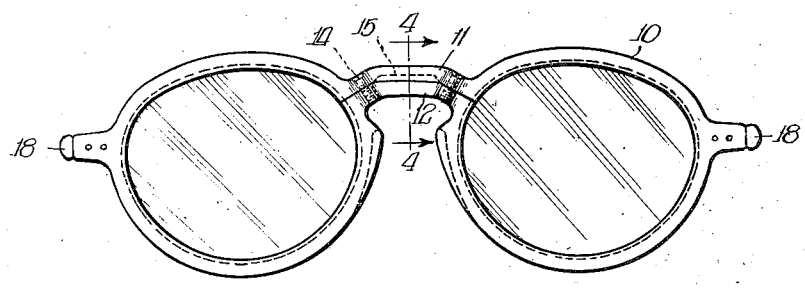
Fig. 1 is a view in elevation showing a plastic spectacle frame embodying the invention.
Figure 2:
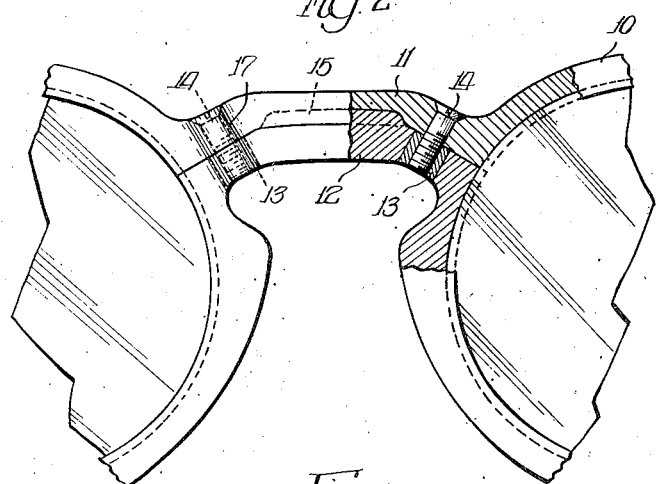
Fig. 2 is a detailed view partially in section to show the bridge structure.

In the drawing the frame of the glasses is indicated by the reference numeral 10. The frame may be of the usual form generally employed in the construction of plastic spectacles except that the bridge has been divided or split lengthwise, as shown in Figs. 1 and 2 of the drawing, to permit the top part 11 of the bridge to be separated from the bottom part 12 so that the lens encasing portion of the frame may be spread apart for ease in removal and replacement of lenses. In order to secure the portions 11 and 12 of the bridge together screw-threaded metallic inserts 13 are molded into the lower portion 12 of the bridge and are adapted to receive screw-threaded members 14 which pass through the upper portion of the bridge and are provided with head portions to secure the upper and lower portions of the bridge together. A further interlock between the bridge portions 11 and 12 may be provided by means of a projection 15, which is shown in the drawing as being on the bottom portion 12, that interlocks in a recessed portion 16, which is shown in the drawing as being in the upper portion 11 of the bridge.

Figure 3:
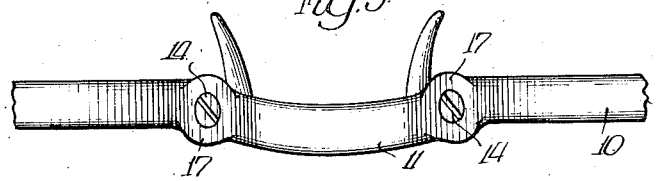
Fig. 3 is a view in top elevation of the bridge structure.
Figure 4:
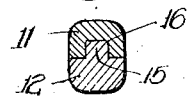
Fig. 4 is a sectional view taken on the line 4—4 of Fig. 1 to illustrate the interlock between the portions making up the bridge.

As shown in Fig. 3, in order to reinforce the bridge where the openings are provided to receive the screw-threaded members 13 and 14, the bridge may be enlarged around these members, as indicated by the reference character 17.

It will be apparent from the foregoing description that the embodiment of the present invention in eyeglasses does not in any way interfere with the employment of substantial hinge members for the attachment of bows, the ends of the bows being indicated by the reference character 18. It will also be apparent that the structure is simple, economical to manufacture and permits of reglazing by unskilled persons merely through the employment of a screwdriver for removing the screw-threaded members 14.

I claim:

1. A frame for glasses constructed from plastic material having portions for surrounding and holding the lenses in place, a bridge connecting said lens holding portions, said bridge being split lengthwise from one lens holding portion to the other substantially at right angles to the front and rear faces of the bridge to provide squared faces for said split portions to be drawn into face-to-face position with respect to each other and to permit the parts thereof to be separated and enlarge the openings for the glass retaining portions and means for securing the portions of said bridge together, said means including an interlock between intermediate portions of the bridge, and said interlock comprising an upstanding portion on the top of a lower intermediate section of said bridge and a recessed portion in the bottom of an upper intermediate section of said bridge engageable with said upstanding portion.

2. A frame for glasses constructed from plastic material having portions for surrounding and holding the lenses in place, a bridge connecting said lens holding portions, said bridge being split lengthwise from one lens holding portion to the other substantially at right angles to the front and rear faces of the bridge to provide squared faces for said split portions to be drawn into face-to-face position with respect to each other and to permit the parts thereof to be separated and enlarge the openings for the glass retaining portions, and means for securing the portions of said bridge together, said means including an interlock between intermediate portions of the bridge, and said interlock comprising an upstanding portion on the top of a lower intermediate section of said bridge and a recessed portion in the bottom of an upper intermediate section of said bridge engageable with said upstanding portion, said upstanding portion occupying a central area of the squared face of the lower intermediate section and snugly fitting into said recessed portion in the upper intermediate section to hold the split portions in aligned position.

3. A frame for glasses constructed from plastic material having portions for surrounding and holding the lenses in place, a bridge connecting said lens holding portions, said bridge being split lengthwise from one lens holding portion to the other substantially at right angles to the front and rear faces of the bridge to provide squared faces for said split portions to be drawn into face-to-face position with respect to each other and to permit the parts thereof to be separated and enlarge the openings for the glass retaining portions, and means for securing the portions of said bridge together, said means including an interlock between intermediate portions of the bridge, and said interlock comprising an upstanding member on the top of a lower intermediate section of said bridge and a recessed portion in the bottom of an upper intermediate section of said bridge engageable with said upstanding portion, said upstanding portion occupying a central area of the squared face of the lower intermediate section and snugly fitting into said recessed portion in the upper intermediate section to hold the split portions in aligned position, and enlarged reinforcing portions in the upper and lower sections of the split bridge adjacent said upstanding member and carrying locking elements to hold all said associated parts in aligned and locked position.

WILLIS A. WHIPPLE.